United States Patent [19]

Kerimis et al.

[11] Patent Number: 4,521,545
[45] Date of Patent: Jun. 4, 1985

[54] LATENT CATALYSTS FOR THE ISOCYANATE POLYADDITION REACTION

[75] Inventors: Dimitrios Kerimis, Cologne; Rudolf Hombach, Leverkusen; Peter Müller, Odenthal-Blecher; Manfred Dollhausen, Odenthal, all of Fed. Rep. of Germany

[73] Assignee: Bayer Aktiengesellschaft, Leverkusen, Fed. Rep. of Germany

[21] Appl. No.: 632,178

[22] Filed: Jul. 19, 1984

[30] Foreign Application Priority Data

Aug. 9, 1983 [DE] Fed. Rep. of Germany ....... 3328661

[51] Int. Cl.$^3$ ............................................. C08G 18/14
[52] U.S. Cl. ...................................... 521/107; 528/51; 528/53
[58] Field of Search ..................... 528/51, 53; 521/107

[56] References Cited

U.S. PATENT DOCUMENTS 4,257,995  3/1981  McLaughlin et al. ................ 528/51
4,331,778  5/1982  Sommerfeld et al. .............. 521/129

OTHER PUBLICATIONS

Kunststoff-Handbuch, vol. III, by Vieweg-Hochtlen, Carl-Hanser Verlang, Munich, 1966, pp. 96–102.

*Primary Examiner*—Maurice J. Welsh
*Attorney, Agent, or Firm*—Gene Harsh; Joseph C. Gil; Lyndanne M. Whalen

[57] ABSTRACT

Compositions which are storage stable at room temperature are made from an organic polyisocyanate, a compound containing at least two isocyanate-reactive groups and a latent catalyst. The latent catalyst is formed from an amine and an alkylating ester of an acid of phosphorus. These compositions react to form isocyanate polyaddition products when exposed to a temperature of 60° C. or higher. These compositions are useful in the production of adhesives, foamed and non-foamed plastics and coatings.

9 Claims, No Drawings

LATENT CATALYSTS FOR THE ISOCYANATE POLYADDITION REACTION

BACKGROUND OF THE INVENTION

This invention relates to a process for the production of polyisocyanate addition products in which ammonium salts are employed as latent, heat-activatable catalysts. The present invention also relates to storage stable formulations containing such latent catalysts.

Catalysts for the isocyanate polyaddition process are known. Such catalysts include, for example, tertiary amines such as triethylene diamine (sold under the trademark Dabco) and organotin compounds such as tin-(II) octoate. Other examples of known catalysts are described, for example, on pages 26 to 29 and 31 to 33 of German Offenlegungsschrift No. 2,854,384.

Information on the mode of action of such catalysts can be found in Kunststoff-Handbuch, Vol. VII, by Vieweg and Hochtlen, Carl-Hanser-Verlag, Munich, 1966, for example on pages 96 to 102.

These known catalysts are generally used in a quantity of from about 0.001 to 10 wt. %, based on the total quantity of compounds containing at least two isocyanate-reactive hydrogen atoms.

One disadvantage of these known catalysts lies in the fact that they show substantially constant activity at temperatures from about 20 to 120° C. Consequently, it is not possible to produce formulations containing these catalysts, polyols and polyisocyanates having an increased pot life because the catalysts accelerate the isocyanate addition reaction at temperatures as low as room temperature.

SUMMARY OF THE INVENTION

It is an object of the present invention to provide latent, heat activatable catalysts for polyisocyanate addition reactions.

It is also an object of the present invention to provide storage-stable (at room temperature) polyurethane-forming formulations which react quickly when heated to a temperature of 60° C. or higher.

These and other objects which will be apparent to those skilled in the art are accomplished by including an ammonium salt catalyst or materials which react to form such an ammonium salt catalyst in a mixture of polyisocyanate and polyisocyanate-reactive material having at least two isocyanate-reactive hydrogen atoms. The ammonium salt catalyst is formed from an amine and an alkylating ester of an acid of phosphorus. These ammonium salt catalysts do not catalyze the polyaddition reaction until the mixture is heated to a temperature of at least 60° C.

DETAILED DESCRIPTION OF THE INVENTION

The present invention relates to ammonium salts of the type obtained by reacting mono- or polyfunctional, primary, secondary and/or tertiary amines with alkylating esters of acids of phosphorus, preferably in an equivalent ratio of alkylating acids of phosphorus to primary, secondary and/or tertiary amine nitrogen atoms of 1:1. This invention also relates to use of these ammonium salts as latent, heat-activatable catalysts for the isocyanate polyaddition reaction.

The ammonium salts useful in the present invention may be obtained by reacting (i) mono- or polyfunctional, primary, secondary and/or tertiary amines with (ii) alkylating esters of acids of phosphorus. In principle, the amine component of these ammonium salts may be any organic compound containing at least one (preferably non-aromatically bound) primary, secondary and/or tertiary amino group optionally forming part of a heterocyclic ring system. The amine nitrogen atom is preferably attached by three single bonds to non-aromatic carbon atoms and/or hydrogen In addition to amino groups, the amine may contain heteroatoms, such as oxygen atoms or nitrogen atoms containing double bonds. The amines used to form the ammonium salts useful in the present invention generally have a molecular weight of from 31 to 300, preferably from 101 to 200.

Specific examples of suitable amines are methylamine, ethylamine, diethylamine, triethylamine, tri-(n-propyl)-amine, di-(n-butyl)-amine, N-methyl-N,N-di-(n-butyl)-amine, piperidine, N-methyl piperidine, morpholine, N-methyl morpholine, permethylated diethylene triamine, diethylene triamine, triethylene diamine, diethanolamine, dipropanolamine, triethanolamine, N,N-dimethyl benzylamine, ethylene diamine, hexamethylene diamine; non-cyclic amidines such as N,N'-dimethyl acetamidine, N,N'-dicyclohexyl-N-methyl acetamidine; monocyclic amidines such as 2,3-dimethyl-3,4,5,6-tetrahydropyrimidine: or bicyclic amidines, such as 1,5-diazabicyclo(3,4,0)non-5-ene and 1,8-diazabicyclo(5,4,0)undec-7-ene.

In addition to the preferred amines mentioned above by way of example, heterocyclic amines in which the amine nitrogen atom is part of a heteroaromatic ring (such as pyridine and 1-methyl pyridine) or aromatic amines (such as aniline and N,N-dimethyl aniline) may also be used to produce the ammonium salts useful in the present invention.

The ammonium salts useful in the present invention may be obtained by reacting the amines mentioned above with neutral, alkylating esters of inorganic or organic acids of phosphorus. In the context of the present invention, the term neutral, alkylating esters of inorganic or organic acids of phosphorus includes all alkyl esters (optionally containing inert substituents) of phosphoric acid, phosphorus acid and all aromatic or aliphatic phosphonic acids which correspond to that definition. The alkyl esters of other acids of phosphorus which correspond to the above definition, for example alkyl esters of phosphinic acids, phosphonous or phosphinous acids, are also suitable in principle but they are less preferred. The corresponding alkyl esters containing from 1 to 4 carbon atoms in the individual alkyl radicals are preferred. Phosphonic acid esters corresponding to the formula

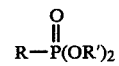

in which

R represents an aromatic hydrocarbon radical optionally containing inert substituents (particularly the phenyl radical) or an aliphatic hydrocarbon radical (preferably an alkyl radical containing from 1 to 4 carbon atoms) and R' (each of which may be the same or different) represents aliphatic hydrocarbon radicals (particularly alkyl radicals containing from 1 to 4 carbon atoms) are particularly preferred.

Typical examples of suitable alkylating esters of phosphorus acids are triethyl phosphite, diethyl phosphite, triethyl phosphate, dimethyl benzyl phosphate, trimethyl phosphite, trimethyl phosphate, benzene phosphonic acid dimethyl ester, p-toluene phosphonic acid diethyl ester, methane phosphonic acid dimethyl ester, n-butane phosphonic acid diethyl ester, ethane phosphonic acid diethyl ester and ethane phosphonic acid dimethyl ester.

Methods for the production of the catalysts of the present invention are known in principle (Houben-Weyl, Vol. XII/2, pages 262 et seq). For example, these catalysts may be produced by reacting the individual amine and alkylating ester components with one another in such a way that the end product contains all of the amine nitrogen atoms in alkylated form. This means that the reaction takes place in a molar ratio of amino groups to alkylating ester of 1:1, the nitrogen atom containing a double bond not being included in this calculation of molar ratio (e.g., where amidines are used). In general, the ester component is used in an excess which excess may be removed, for example by distillation, preferably on completion of the alkylating reaction. The individual amine and ester components are preferably reacted for about 0.5 to 15 hours at temperatures in the range from 50 to 200° C. (preferably from 80 to 180° C.). In general, the reaction is carried out by boiling the reactants under reflux. In many cases, it is of advantage to carry out the reaction in an inert gas atmosphere and/or under pressure. The reaction time and temperature are of course primarily determined by the reactivity of the particular individual components used. Where monofunctional, readily volatile amines are used, the amine may be used in excess and the remaining excess subsequently separated from the reaction product by distillation.

In addition to alkylation of the amine component as described above, the catalysts useful in the present invention may also be produced by neutralizing suitable amines with monobasic acid esters of acids of phosphorus. Since the ammonium salts useful in the present invention contain secondary, ternary or quaternary ammonium ions as cations, where this method of production is adopted, only amines which contain secondary and/or tertiary amino groups may be employed. Suitable neutralizing agents include monobasic acid esters of phosphoric acid, such as diethyl phosphate, di-(n-propyl)-phosphate and di-(n-butyl)-phosphate.

In one variation of this latter method for producing the catalysts of the present invention, the catalysts may be formed in situ during preparation of the polyurethane-forming reaction mixture. For example, the amine may be dissolved in the polyol component and the phosphoric acid ester dissolved in the polyisocyanate component, so that when the two components reacting to form the polyurethane are combined, the catalyst of the present invention is formed by an instantaneous neutralization reaction. Where the catalyst is produced by a neutralization reaction, the appropriate quantitative ratios are the same as discussed above. A more readily volatile component optionally may be used in excess and separated from the reaction product by distillation on completion of the reaction. Where the catalysts are produced in situ, equivalent quantities of the reactants are preferably used. The neutralization reaction may of course be carried out at room temperature.

The catalysts useful in the present invention are generally colorless to yellow, odorless liquids or low-melting crystalline compounds which show no significant catalytic activity in isocyanate addition reactions at temperatures below 30° C. (preferably below 20° C.). It is only at temperatures above 60° C., preferably in the range from 90 to 150° C. and more preferably from 90 to 130° C., that the latent catalysts develop a pronounced catalytic effect. Consequently, the stability in storage of reaction mixtures of polyisocyanates and polyols containing such catalysts is only slightly lower than that of corresponding, uncatalyzed reaction mixtures at low temperatures (i.e. temperatures below 30° C.). However, strong acceleration of the isocyanate addition reaction occurs at higher temperatures (i.e. temperatures above 60° C.).

The catalysts essential to the invention may be used in any polyurethane-forming reaction mixtures in which the combination of an increased processing time on the one hand and a fast reaction at elevated temperatures on the other hand is desirable. This includes, for example, the production of foamed or non-foamed polyurethane-based molded plastics in heatable molds, the production of coatings on heat-resistant substrates on the principle of stove lacquering and, in particular, the formation of bonds between any heat-resistant substrates using two-component adhesives based on a reaction mixture of organic polyisocyanates and organic polyhydroxyl compounds and thermal crosslinking of the adhesive film.

In principle, the catalysts essential to the present invention may be used in any two-component polyurethane systems based on organic polyisocyanates and at least difunctional compounds containing isocyanate-reactive groups.

The polyisocyanate component may be any aliphatic, cycloaliphatic, araliphatic, aromatic or heterocyclic polyisocyanate or any mixture of such polyisocyanates. Particularly suitable polyisocyanates correspond to the formula $$Q(NCO)_n$$

in which n=2-4 (preferably 2) and Q represents an aliphatic hydrocarbon radical containing from 2 to 18 (preferably from 6 to 10) carbon atoms, a cycloaliphatic hydrocarbon radical containing from 4 to 15 (preferably from 5 to 10) carbon atoms, an aromatic hydrocarbon radical containing from 6 to 15 (preferably from 6 to 13) carbon atoms or an araliphatic hydrocarbon radical containing from 8 to 15 (preferably from 8 to 13) carbon atoms. Specific examples of such polyisocyanates are described on pages 10-11 of German Offenlegungsschrift No. 2,832,253.

In general, it is particularly preferred to use commercially readily obtainable polyisocyanates such as 2,4- and 2,6-tolylene diisocyanate and mixtures of these isomers ("TDI"): polyphenyl polymethylene polyisocyanates of the type obtained by phosgenating anilineformaldehyde condensates ("crude MDI"); and polyisocyanates containing carbodiimide groups, urethane groups, allophanate groups, isocyanurate groups, urea groups or biuret groups ("modified polyisocyanates"), particularly modified polyisocyanates of the type derived from 2,4-and/or 2,6-tolylene diisocyanate and from 4,4'- and/or 2,4'-diphenylmethane diisocyanate.

Polyisocyanate-reactive materials which may be used in the production of polyurethanes are compounds containing at least two isocyanate-reactive hydrogen atoms and having a molecular weight of generally from 400 to 10,000. Compounds containing amino groups, thiol groups or carboxyl groups are appropriate. However, compounds containing hydroxyl groups, particularly compounds containing from 2 to 8 hydroxyl groups, especially those having molecular weights in the range from 1000 to 6000 (preferably from 2000 to 4000) are preferred. Examples of these preferred compounds are polyesters, polyethers, polythioethers, polyacetals, polycarbonates and polyester amides containing at least two (generally 2 to 8), preferably 2 to 4 hydroxyl groups. Such compounds which are commonly used for the production of cellular and non-cellular polyurethanes are described, for example, in German Offenlegungsschrift No. 2,832,253, pages 11 to 18.

In addition to the above-described relatively high molecular weight compounds containing isocyanate-reactive groups, it is also possible to use compounds containing at least two isocyanate-reactive hydrogen atoms having a molecular weight of from 32 to 400. These compounds also contain hydroxyl groups and/or amino groups and/or thiol groups and/or carboxyl groups (preferably hydroxyl groups and/or amino groups) and are used as chain-extending agents or cross-linking agents. These low molecular weight compounds generally contain from 2 to 8 (preferably from 2 to 4) isocyanate-reactive hydrogen atoms. Examples of such compounds can be found on pages 19 to 20 of German Offenlegungsschrift No. 2,832,253.

In addition, polyurethanes may be produced using auxiliaries and additives known to those skilled in the art such as water and/or readily volatile inorganic or organic substances as blowing agents; surface-active additives, such as emulsifiers and foam stabilizers; reaction retarders, for example acidreactive substances, such as hydrochloric acid or organic acid halides: cell regulators such as paraffins or fatty alcohols or dimethyl polysiloxanes; pigments or dyes: known flame-proofing agents such as tris-chloroethyl phosphate, tricresyl phosphate or ammonium phosphate and polyphosphate: stabilizers against the effects of ageing and weather; plasticizers; fungistatic and bacteriostatic agents; fillers, such as barium sulfate, kieselguhr, carbon black and whiting; solvents such as those used in the production of stoving lacquers (for example, ethylene glycol monoethyl ether acetate, butyl acetate, methyl ethyl ketone, methyl isobutyl ketone, xylene or mixtures of these solvents).

Such optional auxiliaries and additives are described, for example, on pages 21 to 24 of German Offenlegungsschrift No. 2,732,292.

The ammonium salts essential to the invention are employed in quantities of generally from 0.01 to 2 wt. %, preferably from 0.1 to 1.5 wt. %, based on the polyurethane-forming reaction mixture as a whole. These ammonium salts may be added to the polyisocyanate component, to the polyol component and/or to the mixture of both components.

Having thus described our invention, the following examples are given by way of illustration.

The ammonium salts used in accordance with the invention in the following Examples were prepared as follows:

Ammonium salt I

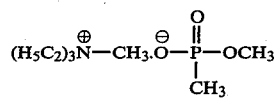

101 parts by weight of triethylamine and 248 parts by weight of methane phosphonic acid dimethyl ester were mixed and gently refluxed with stirring for 8 hours. The excess methane phosphonic acid ester was then distilled off in vacuo. 140 parts by weight of a yellow, viscous liquid were obtained.

Ammonium salt II

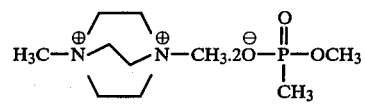

123 parts by weight of triethylene diamine (sold under the trademark Dabco) and 1240 parts by weight of methane phosphonic acid dimethyl ester were stirred for 8 hours at 100° C. while a gentle stream of nitrogen was passed through the reaction vessel. Approximately 400 parts by weight of the excess methane phosphonic acid ester were then distilled off in vacuo, after which the product precipitated was filtered off and dried in vacuo. 335 parts by weight of a colorless, crystalline compound were obtained.

Ammonium salt III

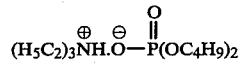

210 parts by weight of dibutyl phosphate and 303 parts by weight of triethylamine were mixed and the resulting mixture gently refluxed with stirring for 8 hours. The excess triethylamine was then distilled off in vacuo. 266 parts by weight of a colorless, low viscosity liquid were obtained.

Ammonium salt IV

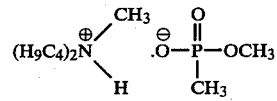

258 parts by weight of dibutylamine and 248 parts by weight of methane phosphonic acid dimethyl ester were mixed and heated with stirring to 135–150° C. The mixture was then cooled with an ice bath to such an extent that the temperature was kept at 140–150° C. by the exothermic reaction. The reaction mixture was then stirred for 5 hours at 150° C. The product obtained was freed from unreacted starting products by distillation in vacuo, leaving 350 parts by weight of a colorless, viscous liquid which slowly crystallized out at room temperature.

Ammonium salt V

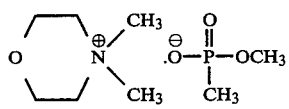

The procedure was the same as for ammonium salt 1, with the exception that an equivalent quantity of N-methyl morpholine was used instead of the triethylamine.

Ammonium salt VI

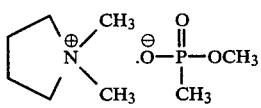

The procedure was the same as for ammonium salt 1, with the exception that an equivalent quantity of N-methyl pyrrolidine was used instead of the triethylamine.

The structures of each of the ammonium compounds mentioned above were confirmed by NMR-spectroscopy.

EXAMPLE 1

25 parts by weight of a trimethyl-propane-started polypropylene oxide polyether (OH number 380) were mixed at room temperature with 25 parts by weight of polypropylene glycol (OH number 56) and 30 parts by weight of a polyisocyanate mixture of the diphenylmethane series (produced by phosgenating aniline/formaldehyde condensates, NCO-content 31 wt. %, viscosity at 25° C. =500 mPa.s). 0.6 wt. % (based on the total weight of the mixture) of ammonium salt III was then added to the resulting mixture.

The mixture thus obtained was applied in a layer thickness of 0.0001 mm to a glass plate preheated to 110° C. which was then heated at 110° C. for 2 minutes, after which the clear lacquer film was dry.

In a parallel test, the mixture containing ammonium salt III was stirred for a while longer at room temperature. A significant increase in viscosity occurred after 30 minutes.

In another parallel test, triethylene diamine rather than ammonium salt III was added to the reaction mixture in a quantity of 0.08 wt. %, based on the mixture as a whole. A film of equal thickness produced under the same conditions had not set after 2 minutes at 110° C. However, the reaction mixture containing triethylene diamine was highly viscous and could no longer be stirred after storage at room temperature for only 9 minutes.

EXAMPLES 2–5

Two-component polyurethane reaction adhesives containing heat-activatable catalysts were produced in Examples 2 and 3 below. To this end, 100 g of a polyol (40 wt. % dispersion of polyhydrazodicarbonamide in a polyether polyol having an OH number of 35 produced by propoxylating trimethylol propane and subsequently ethoxylating the propoxylation product (PO:EO ratio by weight =4.7:1) produced in accordance with German Offenlegungsschrift 2,719,720) were stirred with 37 g of the polyisocyanate mixture of Example 1 (NCO:OH equivalent ratio =0.8:1) and with 1 wt. %, based on the mixture as a whole, of ammonium salt III (Example 2) or IV (Example 3). In Comparison Example 4, 0.1 wt. %, based on the mixture as a whole, of dibutyl tin dilaurate (DBTL) was added as standard catalyst to the same reaction mixture. The reaction mixture of Comparison Example 5 did not contain any catalyst.

The test material was in the form of 20×40×4 mm strips of a cured polyester resin reinforced with 30% glass fibers which were used without any further pretreatment. The strips were bonded to one another with a single overlap of 20×10 mm. The strips were heated to 120° C., coated with the adhesive mixture in a layer thickness of 0.2 mm and the two coated strips subsequently placed on top of one another. After 3 minutes, the "hand strength" was tested to determine whether the adhesive film had already set. Thereafter, the test specimens were stored for 1 hour at 23° C. to determine their ultimate strength. Finally, shear strength was determined in accordance with DIN 532 83.

The results are set out in the following Table I:

TABLE I

| | Example 2 | Example 3 | Example 4 | Example 5 |
|---|---|---|---|---|
| Catalyst | 1% of ammonium salt III | 1% of ammonium salt IV | 0.1% of DBTL (Comparison) | no catalyst (Comparison) |
| Pot life at 23° C. | 45 mins. | 45 mins. | 3 mins. | 4 hr. |
| Cooling time | 1 hr. | 1 hr. | 1 hr. | 1 hr. |
| Hand strength (N/mm²) | 1 | 1 | 1 | — |
| Shear strength (DIN 53283) (N/mm²) | 9.3* | 8.9* | 9.4* | — |

*Signifies value at which material failed.

These results show that two-component polyurethane adhesives formulated to set in 3 minutes at 120° C. (hand strength) by the inclusion of standard catalysts such as DBTL have a pot life of only a few minutes. In contrast, where catalysts according to the invention are used, pot lives of around 45 minutes may be obtained for the same shear strength.

EXAMPLE 6

Production of a cast elastomer

This Example shows that the catalysts used in accordance with the invention are comparable in their catalytic activity with standard catalysts such as tin-(II) octoate at a temperature of from 100 to 110° C.

600 parts by weight of an adipic acid-ethylene glycol-polyester polyol (OH number 56) were dehydrated for 1 hour at 130° C./12 mbar. 94.5 parts by weight of 1,5-diisocyanatonaphthalene (NCO:OH equivalent ratio 1.5:1) were then introduced with stirring at 130° C. The temperature was then kept at 130° C. for another 30 minutes. The NCO-prepolymer thus produced was then divided up into 3 equal parts. 3.46 parts by weight of 1,4-dihydroxy butane (NCO:OH equivalent ratio in respect of the NCO-groups in the prepolymer and the hydroxyl groups in the chain extending agent =1.3:1) were then added to each of these 3 parts. 0.1 wt. % based on the mixture as a whole, of ammonium salt IV and 0.1 wt. %, based on the mixture as a whole, of tin-(II) octoate were added to the first and second samples, respectively, at the same time as the chain-extending agent. No catalyst was added to the third sample. All three samples, each in the form of a homogeneous melt, were each cast into prepared metal molds kept at 100-110° C. In the case of the two catalyst-containing samples, mold release was possible after 10 minutes. In the case of the uncatalyzed sample, mold release was only possible after 4 hours.

EXAMPLE 7

Swelling test for qualitatively comparing polyurethane catalysts (Britain and Gemeinhardt in J. Appl. Polymer Sci. 4, 207 (1960)).

To systematically study the ammonium salts as latent catalysts for the isocyanate polyaddition reaction, 0.2 g of each of ammonium salts I, II, V and VI was added to quantities of 50 g of a polyether polyol (OH number 380) produced by the propoxylation of trimethylol propane. 31.3 g of tolylene-2,4- and -2,6-diisocyanate (isomer mixture 80:20) at different temperatures of 25, 60 and 100° C. (NCO:OH equivalent ratio =1.09:1). The time required for crosslinking to take place was measured, as was the maximum temperature $T_{max}$ reached. In a parallel test, tin-(II) octoate was tested as a comparison catalyst. The results are set out in Table II.

TABLE II

| Diisocyanate added at °C. | Ammonium salt | $T_{max}$ °C. | Crosslinking after secs |
|---|---|---|---|
| 25° C. | tin-(II) octoate (comparison) | 80 | 28 |
| | I | 89 | 360 |
| | II | 55 | 1800 |
| | V | 61 | 1860 |
| | VI | 76 | 1380 |
| 60° C. | tin-(II) octoate (comparison) | 122 | 25 |
| | I | 140 | 48 |
| | II | 138 | 98 |
| | V | 170 | 90 |
| | VI | 140 | 110 |
| 100° C. | tin-(II) octoate (comparison) | 178 | 15 |
| | I | 178 | 15 |
| | II | 155 | 24 |
| | V | 190 | 20 |
| | VI | 184 | 13 |

As can be seen from these results, the ammonium catalysts according to the invention show a much more temperature-dependent behavior than the standard catalyst (tin-(II) octoate). The activity of the ammonium salt catalysts at room temperature was substantially lower than that of the comparison catalyst but it increased considerably with increasing temperature and, at 100° C., was even higher than that of the comparison catalyst.

EXAMPLE 8

(Catalysis of the isocyanate-water reaction)

The catalyzed reaction of isocyanates with water, which is accompanied by the elimination of $CO_2$, gives ureas in accordance with the following equation, $$2R-NCO + H_2O \xrightarrow{catalyst} R-NH-CO-NH-R + CO_2$$

Basic catalysts activate the reaction at temperatures as low as room temperature. Where diisocyanates are used, polyureas are formed at higher temperatures.

To systematically investigate the effect of the ammonium salts of the present invention upon this reaction, 17.4 g (0.1 mole) of the diisocyanate mixture described in Example 7 dissolved in 30 g of acetonitrile or dioxane were added at different temperatures of 25, 65 and 95° C. to 0.2 g of a particular ammonium salt and 1.62 g (0.09 mole) of water in 20 g of acetonitrile (or dioxane). The time required for the formation of 1 liter of carbon dioxide was measured. The standard catalyst, triethylene diamine (sold under the trademark Dabco), was tested in a parallel test. The results are shown in Table III.

TABLE III

| Addition of at | Ammonium salt | 1 liter of $CO_2$ after secs. |
|---|---|---|
| 25° C. in acetonitrile | Dabco | 53 |
| | I | 8000 |
| | II | 7059 |
| | V | 6792 |
| | VI | 5901 |
| 65° C. in acetonitrile (reflux) | Dabco | 50 |
| | I | 825 |
| | II | 770 |
| | V | 1050 |
| | VI | 610 |
| 95° C. in dioxane (reflux) | Dabco | 46 |
| | I | 136 |
| | II | 322 |
| | V | 240 |
| | VI | 143 |

Once again, the results show that, in contrast to Dabco, the ammonium salt catalysts according to the invention show pronounced temperature-dependent behavior. With most of the ammonium salt catalysts according to the invention, an increase in temperature of around 40° C. increased the catalytic activity by a power of ten.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition which is storage stable at room temperature which crosslinks very quickly when exposed to a temperature of 60° C. or higher comprising:
 (a) an organic polyisocyanate,
 (b) a compound containing at least two isocyanatereactive groups and having a molecular weight of from 400 to 10,000 and
 (c) an ammonium salt of an amine and alkylating ester of an acid of phosphorus latent heat-activatable catalyst.

2. The composition of claim 1 in which the ammonium salt (c) is formed from an amine in which the amino nitrogen is bonded to non-aromatic carbon atoms and an alkylating ester of an acid of phosphorus.

3. The composition of claim 1 in which the ammonium salt (c) is formed from an amine and an alkylating ester of phosphoric, phosphorus or phosphonic acid.

4. The composition of claim 3 in which the amine contains a nitrogen atom attached by three single bonds to non-aromatic carbon atoms.

5. The composition of claim 4 in which the amine and alkylating ester are used in an equivalent ratio of 1:1.

6. The composition of claim 1 in which the ammonium salt (c) is formed by reacting amine with alkylating ester of an acid of phosphorus in an equivalent ratio of 1:1.

7. A process for the production of polyisocyanate addition products comprising heating a mixture of
(a) an organic polyisocyanate,
(b) a compound containing at least two isocyanate-reactive groups and having a molecular weight of from 400 to 10,000 and
(c) a catalyst formed from an amine and alkylating ester of an acid of phosphorus
to a temperature of 60° C. or higher.

8. The process of claim 7 in which catalyst (c) is formed by reacting amine and alkylating ester of an acid of phosphorus in an equivalent ratio of 1:1.

9. The process of claim 7 in which the mixture of (a), (b) and (c) is applied to at least one of two heat-resistant substrates to be bonded together before that mixture is heated to a temperature of 60° C. or higher.

* * * * *